United States Patent [19]
Stine et al.

[11] 3,919,115
[45] *Nov. 11, 1975

[54] FLUIDIZED CATALYST REGENERATION PROCESS

[75] Inventors: Laurence O. Stine, Western Springs; Algie J. Conner, Downers Grove, both of Ill.

[73] Assignee: Universal Oil Products Company, Des Plaines, Ill.

[ * ] Notice: The portion of the term of this patent subsequent to Oct. 29, 1991, has been disclaimed.

[22] Filed: Mar. 25, 1974

[21] Appl. No.: 454,629

Related U.S. Application Data

[63] Continuation of Ser. No. 263,399, June 8, 1972, abandoned.

[52] U.S. Cl. .............. 252/417; 208/120; 208/164; 252/419
[51] Int. Cl.² .............. B01J 37/12; C10G 35/00
[58] Field of Search .............. 252/417, 419, 414; 208/164, 120; 23/288 B, 288 S

[56] References Cited
UNITED STATES PATENTS
3,844,973  10/1974  Stine et al ................. 252/417

Primary Examiner—Patrick P. Garvin
Assistant Examiner—P. E. Konopka
Attorney, Agent, or Firm—James R. Hoatson, Jr.; Thomas K. McBride; William H. Page, II

[57] ABSTRACT

A process conducted in a regeneration zone, comprising a first dense bed, a dilute phase transport riser, and a second dense bed, wherein coke-contaminated spent catalyst is oxidized to a controllable residual coke level and CO thereby produced is essentially completely burned to $CO_2$. Spent catalyst is regenerated in the first dense bed to the desired coke level by controlling the stream of fresh regeneration gas to that bed. Combustion of CO takes place in the dilute phase transport riser through which regenerated catalyst passes at residence times sufficiently short to preclude further regeneration.

5 Claims, 3 Drawing Figures

3,919,115

FLUIDIZED CATALYST REGENERATION PROCESS

CROSS-REFERENCES TO RELATED APPLICATION

This is a continuation application of pending application Ser. No. 263,399, filed on June 8, 1972, now abandoned.

By controlling the residual coke level on regenerated catalyst, the process allows the refiner to directly and conveniently control the conversion level and product distribution obtained in the reaction zone. At the same time within the regeneration zone combustion of CO substantially eliminates CO pollution of the atmosphere and recovers the heat of combustion without the need for a CO boiler which decreases feed preheat requirements. Higher velocities and higher $O_2$ concentrations employed in the process result in shorter catalyst and gas residence times, reduced catalyst inventory, lower catalyst makeup rate, improved regeneration, and improved catalyst stability.

BACKGROUND OF THE INVENTION

1. Field of the Invention

The field of art to which the invention pertains is hydrocarbon processing. More particularly, this invention relates to systems in which a fluidized catalyst is continuously recycled between a reaction zone wherein it becomes spent by carbonaceous deposits and a separate regeneration zone wherein its activity is restored by removal of the deposits. Specifically, the present invention relates to a regeneration process which is applicable for the controlled oxidative removal of carbonaceous deposits from a spent fluidized catalytic cracking catalyst along with the essentially complete combustion of CO thereby produced.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone. Among such processes are fluid coking, fluid dehydrogenation, and fluid catalytic cracking.

One of the more important processes of this nature is the fluid catalytic cracking process for the conversion of relatively high-boiling hydrocarbons to lighter hydrocarbons boiling in the heating oil and gasoline (or lighter) range. The hydrocarbon feed is contacted in one or more reaction zones with the particulate cracking catalyst maintained in a fluidized state under conditions suitable for the conversion of hydrocarbons.

The gaseous effluent from the reaction zone is passed to a product recovery zone while the catalyst is generally passed to a stripping zone for removal of strippable hydrocarbons from the particles. The stripped catalyst is subsequently introduced into a fluidized regeneration zone where non-strippable carbonaceous material is contacted with an oxygen-containing gas, for example air, under conditions such that a major portion of the carbon on the catalyst particles is removed therefrom by combustion.

Generally, the regeneration is done in a single dense bed located in the bottom portion of the regeneration zone. Provisions are made for recovering and returning to the dense bed catalyst entrained in the flue gas effluent passing from the dense bed. This is generally carried out by passing this effluent flue gas containing entrained catalyst through cyclones located in the rather large disengaging space which is positioned above and in connection with the dense bed.

Superficial velocities within the regeneration zone are generally within the range of about 1.5 to 6 feet per second with 1.5 to 3 feet per second being the more common range. Residence time of the catalyst within the regeneration zone is generally in the 2 to 5 minute range with 2 to 3 being the more common, while the residence time of gas is generally within the range of 10 to 20 seconds.

It is the present practice to control the oxygen-containing gas stream introduced to such regeneration zone directly responsive to a predetermined temperature differential between the gas outlet disengaging space and the dense bed of the regeneration zone to minimize excess oxygen therein and to thereby control and limit the amount of afterburning of CO to $CO_2$ in the upper disengaging portion of the regeneration zone. This restricting of afterburning of CO is done for the very practical reason of avoiding the damaging effects of excessively high temperatures in the upper disengaging space. This practice, as exemplified by Pohlenz U.S. Pat. Nos. 3,161,583 and 3,206,393, produces a small amount of oxygen in the flue gas, generally in the range of 0.1 to 1% oxygen.

More importantly, the present practice of controlling the amount of fresh regeneration gas such as to permit a slight amount of afterburning also fixes the degree of catalyst regeneration, that is, the residual coke on the regenerated catalyst. Although it is widely known that the level of coke content on regenerated catalyst has a great influence on the conversion and product distribution obtained in the reaction zone, residual coke level on regenerated catalyst produced by present regeneration processes is not an independent variable. The coke level when the controlled afterburning technique is used is fixed by regenerator design at some low level, typically from about 0.05 to 0.4 wt. % carbon, and more often from about 0.15 to 0.35 wt. % carbon.

Present industry practice is generally to direct the flue gas which contains CO either directly to the atmosphere or to a CO boiler where it is used as fuel to make steam. In another application, as disclosed in Campbell U.S. Pat. No. 3,363,993, the flue gas is fired as fuel in a heater which is used to preheat the fresh feed charged to the reaction zone of the fluid catalytic cracking process. Pfeiffer et al, U.S. Pat. No. 3,104,227, discloses directing the flue gas to an expanderturbine CO boiler combination to produce the power required to drive the fresh regeneration gas compressor.

Although the efficiency of cyclones and other such equipment for the recovery of solid catalyst particles is usually very high, some catalyst is always physically lost from the regeneration zone. With time, catalyst within the system loses activity and therefore becomes effectively lost because of the cumulative effects of exposure to contaminant metals contained in the fresh feed, high temperatures, and steam. As well, equilibrium catalyst must be withdrawn and replaced with fresh catalyst to maintain desired catalyst activity. For these reasons, it is necessary or desirable to add fresh make-up catalyst to maintain the desired total inventory at the desired equilibrium activity of the catalyst. Typical daily make-up catalyst rates are between about 0.5 to 2.0% of total catalyst inventory in the system with the average being about 1% of inventory per day. Because fluid catalytic cracking catalysts, particularly those containing zeolites, are relatively expensive, it is evident that processes requiring large inventories and therefore large catalyst make-up rates tend to be less economically attractive. As a result thereof, every effort is made to reduce the initial catalyst inventory investment and that portion of overall operating costs associated with catalyst make-up.

Since most of the catalyst inventory is contained within the regeneration zone, it is the present practice to employ operating conditions in the regeneration zone that favor high carbon burning rates, thereby permitting lower regenerator inventories. Such desired operating conditions are high partial pressure of oxygen and high temperature. There have been, therefore, recent industry trends toward higher pressure and higher temperature regenerators for this reason of obtaining higher burning rates. Previously the preferred pressure range had been from about 10 to about 25 psig and preferred temperatures had been in the 1100°–1150°F range. Pressures in the range of 30–40 psig and temperatures in the range of 1150° to 1250° F or higher are now rather common. Although some inventory reduction has been achieved, limitations on these approaches have been imposed by higher equipment costs due to higher pressures and by increased catalyst deactivation due to long residence time in the high temperature regenerators, and by the terminal velocity above which the catalyst cannot be maintained in the lower part of the regeneration zone as a dense bed.

Further attempts to reduce catalyst inventories and makeup rates have been made by effecting a staged regeneration within a regeneration vessel. U.S. Pat. Nos. 3,494,858 (E. C. Luckenbach) and 3,563,911 (R. W. Pfeiffer and L. W. Garret, Jr.) are such examples.

U.S. Pat. No. 3,494,858 discloses a countercurrent regeneration process in which spent catalyst is partially regenerated in a first fluidized bed with partially spent regeneration gas, further regenerated in a transfer line regeneration zone with fresh regeneration gas and then passed to a second fluidized bed wherein further regeneration may or may not take place with partially spent regeneration gas. Preferred superficial velocities are in the range of 2.5 to 3.0 ft./sec. and preferred temperatures are about 1100° to 1175°F. No afterburning of CO to $CO_2$ is mentioned but "substantially complete" removal of carbon to a level below 0.2% and possibly as low as 0.1% is contemplated. Substantially completely regenerated catalyst may then be stripped of high oxygen-containing gases in a separate stripping zone with steam or flue gas.

U.S. Pat. No. 3,563,911 discloses a two-stage regeneration process in which spent catalyst is partially regenerated in a first dense bed with a first oxygen-containing gas stream and then further regenerated in a second dense bed with a second oxygen-containing gas stream. A common dilute phase is superimposed above both dense beds. Preferably, superficial velocities are maintained in the range of about 2 to 4.5 feet per second and the preferred temperature range is from about 1125°F to 1350°F. It is desirable in the process of this invention to control by means of a flue gas and last bed temperature differential the amount of oxygen-containing gas admitted to the regeneration zone such that only a small amount of CO afterburning takes place. This is consistent with present industry practice on single-stage regeneration zones. Examples are presented which indicate that at gas velocities of 2.5 and 4.5 feet per second some degree of inventory reduction over that of a particular type of single stage regeneration can be achieved by staging. A disadvantage, however, is that there is an upper limit of residual coke to which the catalyst can be regenerated by staging with beneficial results.

The process of our invention provides not just for limited, controlled afterburning of CO but for the essentially complete combustion of the CO present. For this purpose, and others, a specific dilute phase transport riser has been provided. By so separating CO oxidation from coke oxidation within the regeneration zone, fresh regeneration gas can now be controlled to obtain the degree of coke oxidation desired rather than to limit the amount of CO afterburning. By the process of our invention, therefore, residual coke on regenerated catalyst can be controlled directly for the purpose of controlling reaction zone conversion and product yield structure. At the same time, the CO so produced from coke oxidation is essentially completely combusted, thereby eliminating an air pollution problem without the need for a CO boiler at the same reducing feed preheat requirements. Further, by employing in the process of our invention higher velocities and temperatures than those presently used, dramatic catalyst inventory reductions, independent of residual coke level, are possible. Additional advantages of higher velocities and reduced inventory are shorter catalyst residence times, lower catalyst makeup rates, improved regeneration and improved catalyst stability.

SUMMARY OF THE INVENTION

Our invention can briefly be summarized as a process for the regeneration of coke contaminated catalyst, removed from a reaction zone, and the combustion of CO thereby produced wherein the residual coke on regenerated catalyst is directly controllable. A broad embodiment of our invention resides in the process comprising the steps of: (a) passing said catalyst to a first dense bed of particulate material in a regeneration zone and controlling the rate of fresh regeneration gas, to said first dense bed, to oxidize said coke to a predetermined residual coke level; (b) oxidizing coke in said first dense bed at oxidizing conditions to produce partially spent regeneration gas, containing CO, and regenerated catalyst having residual coke thereon; (c) passing said regenerated catalyst and partially spent regeneration gas to a dilute phase transport riser, in said regeneration zone, and therein converting CO to $CO_2$ at conversion conditions, to produce spent regeneration gas; (d) separating the thus-regenerated catalyst from said spent, regeneration gas; and, (e) introducing said regenerated catalyst into a second dense bed of particulate material from which said regenerated catalyst is returned to said reaction zone.

DESCRIPTION OF THE DRAWING

Having thus described the invention in brief general terms, reference is now made to the schematic drawings in order to provide a better understanding of the present invention.

It is to be understood that the drawings are shown only in such details as are necessary for an understanding of the invention and that various items such as valves, bleed and dispersion steam lines, instrumentation and other process equipment and control means have been omitted therefrom for the sake of simplicity.

Figure 1:
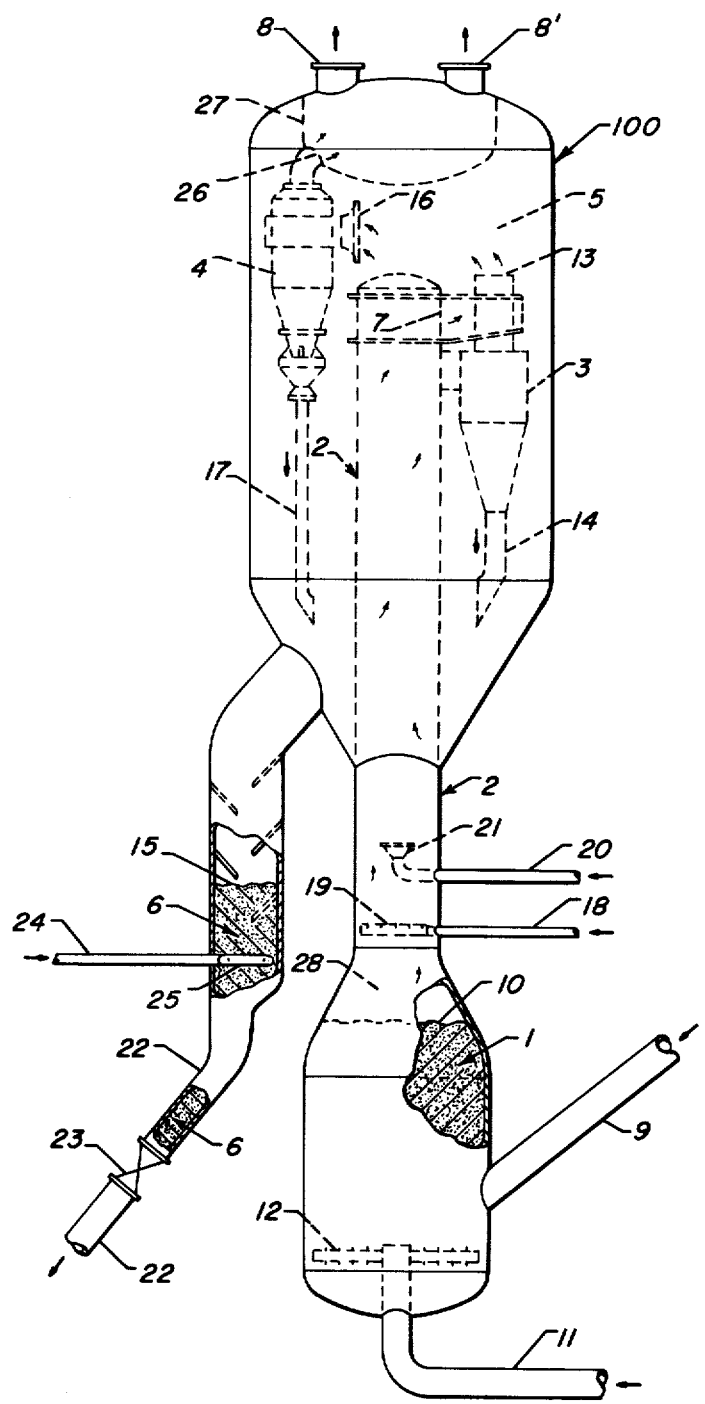
Figure 3:
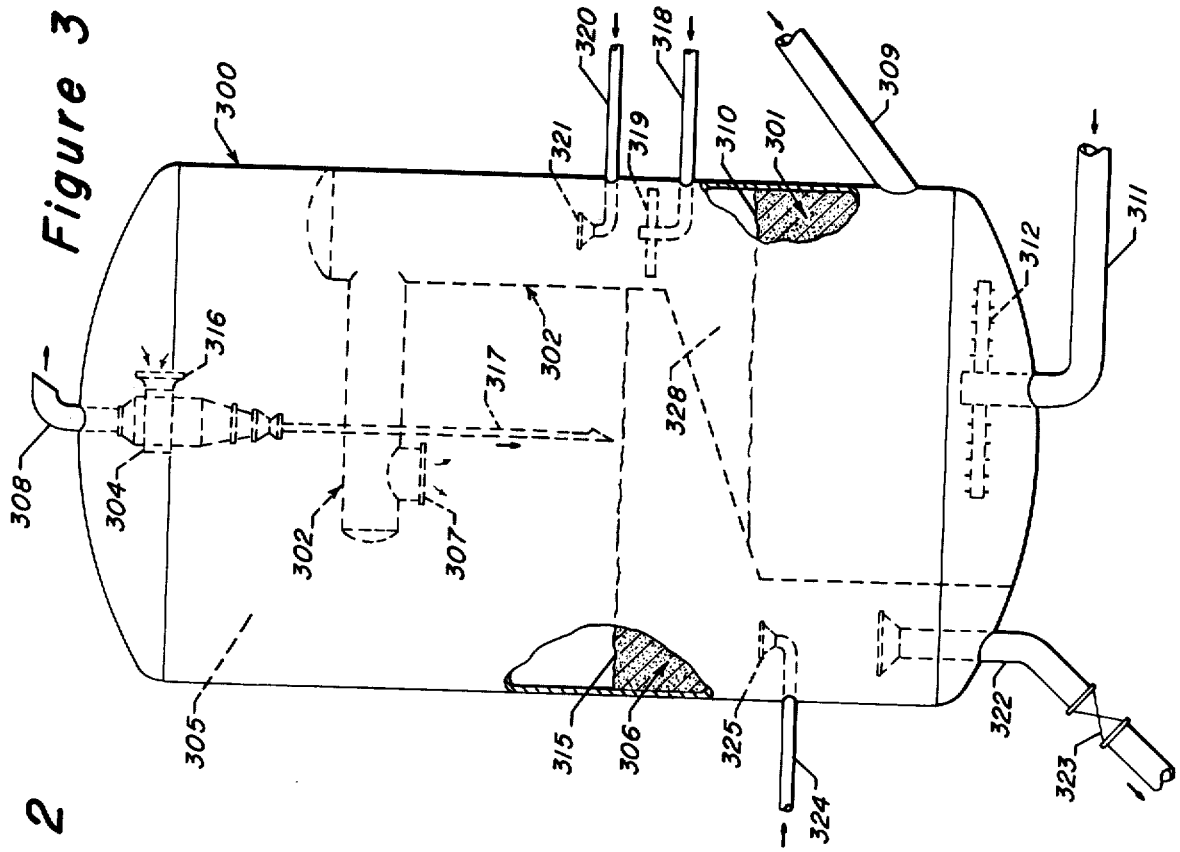
Figure 2:
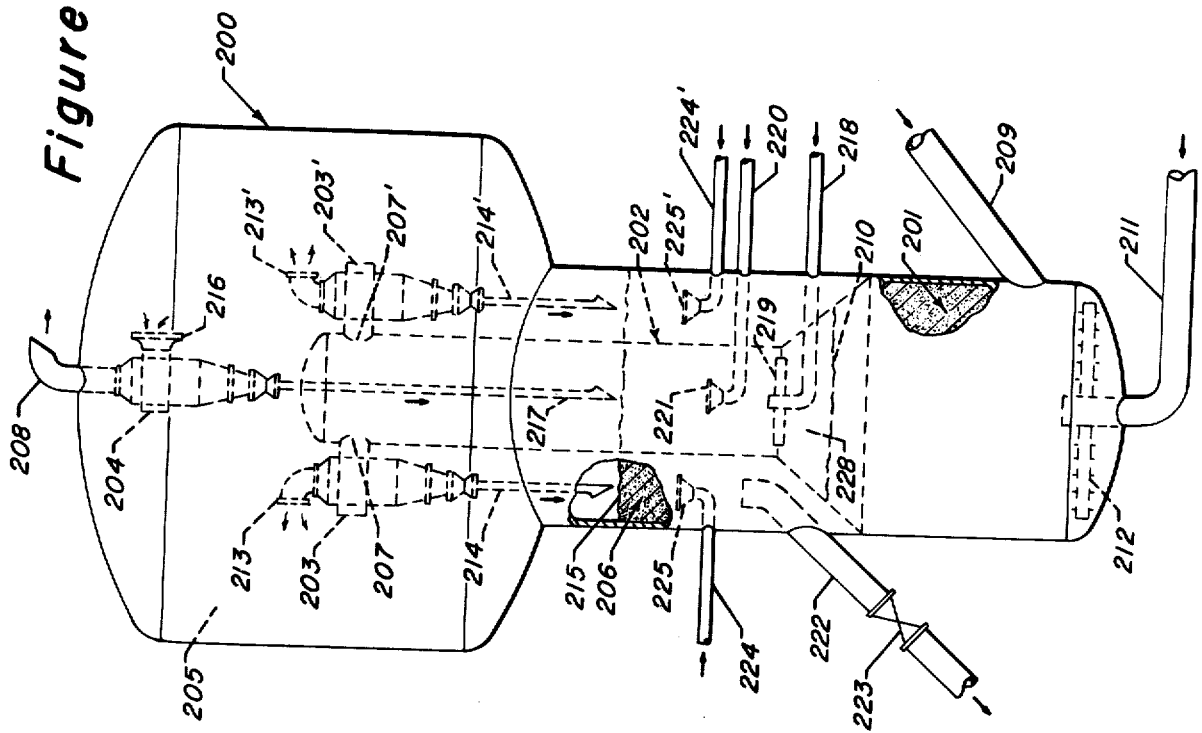

The drawings of this specification include FIG. 1 which depicts schematically a specific apparatus suitable for carrying out the process of our invention, and FIG. 2 and FIG. 3 which depict alternate apparatus also suitable for carrying out this invention. FIGS. 2 and 3 include the same principles as FIG. 1; FIG. 3 is of particular interest because it indicates how the present invention might be applied to an existing regeneration vessel.

FIG. 1 shows a regeneration apparatus 100 basically containing a first dense bed 1, a dilute phase transport riser 2, a catalyst and regeneration gas separation means 3 and 4, a disengaging space 5 and a second dense bed 6. First dense bed 1 is shown at the lower portion of the figure and is connected to one of a vertically extending dilute phase riser 2 through a transition region 28. Catalyst and regeneration gas separation means 3 and 3' are attached to the outlets 7 of transport riser 2. Separated regeneration gas leaving separation means 3 passes into disengaging space 5 then into separation means 4, exits at 26 into plenum chamber 27. Regeneration gas leaves the plenum chamber 27 and the regeneration zone via outlets 8 and 8'. Separated catalyst from separation means 3 and 3' and 4 is directed to second dense bed 6.

Spent catalyst is introduced through inlet line 9 to the first dense bed 1 having a level indicated at 10 which is located in a transition region 28 positioned between the first dense bed 1 and the transport riser 2. A controlled stream of fresh regeneration gas is introduced via line 11 into dense bed 1 through distributing device 12 which allows the fresh regeneration gas to be more readily dispersed within the dense bed 1. Typically the distributing device can be a metal plate containing holes or slots or preferably a pipe grid arrangement, both types of which are quite familiar to those skilled in the art. Controlled oxidation of the carbonaceous deposits to the desired residual carbon level takes place in dense bed 1 and partially spent regeneration gas and fluidized regenerated catalyst are carried out of bed 1 through the transition region 28 into transport riser 2 wherein CO oxidation takes place to produce spent regeneration gas and where the heat of combustion of the CO to $CO_2$ is transferred to the catalyst being transported.

Transport riser 2 is vertically positioned having its inlet at the lower portion and its outlet means 7 near its top portion. Outlet means 7 may be single or multiple openings located at or near the uppermost portion of transport riser 2 which allow regenerated catalyst and spent regeneration gas to pass out of transport riser 2. As shown in FIG. 1 catalyst and regeneration gas separation means 3 is attached to the outlets 7 of transport riser 2. Separation means 3, typically cyclone separation means, are used to achieve a substantial separation of spent regeneration gas and entrained catalyst which pass out of transport riser 2. Although the FIG. 1 shows only one such cyclone attached to the transport riser 2, it is contemplated that from 1 to 4 cyclones could be so positioned. Entrained catalyst and regeneration gas pass via outlet 7 into the separation means 3 out of which spent regeneration gas substantially free of catalyst passes out of the separation means through outlet 13 while catalyst passes through dipleg 14 directed toward second dense bed 6. Optionally, separation means 3 could be omitted, leaving regeneration gas and catalyst exiting outlet means 7 to directly enter disengaging space 5. Some separation of regeneration gas and catalyst would be achieved but not as efficiently as with cyclone separation means 3 as shown.

Separation means 4, also typically a cyclone separation means, has an inlet 16 which receives regeneration gas and any entrained catalyst located in the disengaging space 5. Regeneration gas and any entrained catalyst are substantially separated from each other with the spent regeneration gas passing out of the separation means 4 at outlet 26, and into plenum chamber 27 and then out of the regeneration zone via spent regeneration gas outlet 8 and 8'. Catalyst separated from the regeneration gas is passed via dipleg 17 downward toward second dense bed 6 having a level indicated at 15.

An external combustible fluid such as fuel gas or a liquid hydrocarbon stream is admitted to the transport riser 2 through line 20 via distributor 21. The burning of such a fluid may be necessary to assist in initial process startup, to increase the temperature within the dilute phase transport zone 2 sufficiently to initiate CO oxidation, and may be required to further increase the temperature of the catalyst particles passing through the riser, beyond that which could be achieved by the CO burning alone. The temperature of the regenerated catalyst delivered to the reaction zone can, therefore, be controlled independently of the degree of coke oxidation by controlling the stream of combustible fluid burning in the transport riser. Although not shown in the Figures, additional fuel could be added to the first dense bed 1 for some of or all the above reasons.

Additionally, a second stream of fresh regeneration gas is admitted to the transport riser through line 18 via distributor 19. This fresh regeneration gas stream may be for the purpose of supplying needed oxygen to support burning of the external combustible gas or may be done for the purpose of venting fresh regeneration gas in excess of that required for the degree of coke oxidation desired in dense bed 1. As well, this stream of regeneration gas could be used to cool the regenerated catalyst down to the predetermined catalyst delivery temperature in the event that the complete combustion of CO produced higher than desired catalyst temperature. Although one inlet line for the second stream of regeneration gas is shown, there could be multiple inlet lines positioned along the length of the transport riser.

Catalyst passing through diplegs 14 and 17 discharges downward toward the second dense bed 6.

This second dense bed 6 is so positioned in relationship to the first dense bed 1 as to maintain a sufficient head of regenerated catalyst necessary to overcome any pressure drop in regenerated catalyst exit line 22, control valve 23, and in any equipment downstream connected to line 22. Although FIG. 1 shows the second dense bed 6 positioned immediately above the first dense bed 1, they may be separated by a sufficient distance to provide this head. Furthermore, the level 15 of catalyst within the second dense bed 6 may be controlled as to provide the desired residence time within the bed. It should be noted that second dense bed 6 need not be a stripper as indicated in FIGS. 1, 2 and 3. The term second dense bed as used in this specification means regenerated catalyst maintained in dense bed for head and sealing purposes prior to being returned to the reaction zone.

The catalyst in bed 6 moves in a downward direction and eventually passes out of the regeneration vessel via conduit 22. Also located on conduit 22 is a valve 23 which may be used to control the rate of withdrawal of regenerated catalyst from bed 6. Typically, valve 23 is a slide valve and is operated by a reactor temperature controller or level controller.

A stripping medium can be admitted to the second dense bed 6 through line 24 via distributor 25 to strip from the regenerated catalyst adsorbed and interstitial regeneration gas. Generally the stripping medium will be superheated stream.

It is anticipated in the process of this invention that most of the catalyst within the regeneration zone will be contained in the first dense bed with the smaller portion contained in the second dense bed. More specifically when steam stripping is employed within the second dense bed 6, the second dense bed volume will be so designed such that the catalyst residence time within the bed will be less than 1 minute and preferably less than 30 seconds.

Shown in FIG. 2 is an alternate apparatus 200 in which this invention may be practiced. Primary components are: a first dense bed 201, a dilute phase transport riser 202, a transition region 228, catalyst and regeneration gas separation means 203 and 203' and 204, a disengaging space 205 and a second dense bed 206. First dense bed is again shown at the lower portion of the figure and is connected to one end of a vertically extending dilute phase riser 202 through a transition region 228. Catalyst and regeneration gas separation means 203 and 203' are attached to outlets 207 and 207' of transport riser 202. Separated regeneration gas leaving separation means 203 and 203' via outlets 213 and 213' passes into disengaging space 205, then into separation means 204, and finally exits the regeneration zone via line 208. Separated catalyst from separation means 203 and 203' and 204 is directed via diplegs 214, 214' and 217 to second dense bed 6.

Spent catalyst is introduced through inlet line 209 to the first dense bed 201 having a level indicated at 210 which is within the transition region 228. A controlled stream of fresh regeneration gas is introduced via line 211 into dense bed through distributing device 212 which allows the fresh regeneration gas to be more readily dispersed within the dense bed 201. Typically the distributing device can be a metal plate containing holes or slots or preferably a pipe grid arrangement, both types of which are quite familiar to those skilled in the art. Oxidation of the carbonaceous deposits to a residual carbon level, which can be independently controlled if desired, takes place in dense bed 201 and partially spent regeneration gas and fluidized regenerated catalyst are carried out of bed 201 through the transition region 228 and into transport riser 202 wherein CO oxidation takes place to produce spent regeneration gas and where heat is transferred to the catalyst.

Transport riser 202 is vertically positioned having its inlet at the lower portion and its outlet means 207 and 207' near its top portion. Outlet means 207 and 207' may be openings located at or near the uppermost portion of transport riser 202 which allow catalyst and regeneration gas to pass out of transport riser 202. As shown in FIG. 2 catalyst and regeneration gas separation means 203 and 203', typically cyclones, are attached to the outlets 207 and 207' of transport riser 202 and are used to achieve a substantial separation of spent regeneration gas and entrained catalyst passing out of transport riser 202 so that the material present in the disengaging space 205 is essentially regeneration gas with very little entrained catalyst present. Entrained catalyst and regeneration gas pass from riser 202 via outlets 207 and 207' into the separation means 203 and 203' where regeneration gas substantially free of catalyst passes out of the separation means through outlets 213 and 213' and catalyst passes through diplegs 214 and 214' downward toward second dense bed 206 having a level indicated at 215. As mentioned in the FIG. 1 description, separation means 203 and 203' could be omitted, leaving regeneration gas and catalyst exiting outlet means 207 and 207' to directly enter disengaging space 205. Some separation of regeneration gas and catalyst would be achieved but not as efficiently as with cyclone separation means 203 and 203' as shown.

Separation means 204, also typically a cyclone separation means, has an inlet 216 which receives regeneration gas and any entrained catalyst located in the disengaging space 205. Regeneration gas and any entrained catalyst are substantially separated from each other with the regeneration gas passing out of the separation means 204 and out of the regeneration zone via regeneration gas outlet 208. Catalyst separated from the regeneration gas is passed via dipleg 217 downward toward the second dense bed 206.

An external combustible fluid such as fuel gas or a liquid hydrocarbon stream is admitted to the transport riser 202 through line 220 via distributor 221. The burning of such a fluid may be necessary, as previously mentioned, to assist in initial process startup, to increase the temperature within the dilute phase transport riser 202 sufficiently to initiate CO oxidation, and it may also be required to further increase the temperature of the catalyst particles passing through the riser, beyond that which could be achieved by the CO burning alone. The temperature of the regenerated catalyst delivered to the reaction zone can, therefore, be controlled independently of the degree of coke oxidation by controlling this stream of combustible fluid burning in the transport riser.

Additionally, a second stream of fresh regeneration gas is admitted to the transport riser through line 218 via distributor 219. This fresh regeneration gas stream as mentioned in the FIG. 1 description may be for the purpose of supplying needed oxygen to support burning of the external combustible gas or may be done for the purpose of venting fresh regeneration gas in excess of that required for the degree of coke oxidation desired in dense bed 201. As well, this stream of regeneration gas could be used to cool the regenerated catalyst down to the predetermined catalyst delivery temperature in the event that the complete combustion of CO produced higher than desired catalyst temperature. Although one inlet line for the second stream of regeneration gas is shown in FIG. 2, there could be multiple inlet lines positioned along the length of the transport riser.

Catalyst passing through diplegs 214 and 214' and 217 discharges downward toward second dense bed 206 which has an interface 215 defining the boundary between the disengaging space 205 and the dense bed 206.

This second dense bed 206 is so positioned above the first dense bed 201 to maintain a sufficient head of regenerated catalyst to overcome any pressure drop in regenerated catalyst exit line 222, control valve 223, and in any equipment downstream connected to line 222. Although FIG. 2 shows the second dense bed 206 positioned immediately above the first dense bed 201 they may be separated by a sufficient distance to provide this head. As a consideration independent of dense bed location, the level 215 of the dense bed can be controlled as required to provide the desired catalyst residence time within the bed.

The catalyst in bed 206 moves in a downward direction and eventually passes out of the regeneration vessel via conduit 222. Also located on conduit 222 is a valve 223 which may be used to control the rate of withdrawal of regenerated catalyst from bed 206. Typically, valve 223 is a slide valve and is operated by a reactor temperature controller or level controller.

A stripping medium can be admitted to the second dense bed 206 through lines 224 and 224' via distributors 225 and 225' to strip from the regenerated catalyst adsorbed and interstitial regeneration gas. Generally the stripping medium will be superheated steam.

As previously mentioned, it is anticipated in the process of this invention that most of the catalyst within the regeneration zone will be contained in the first dense bed with the smaller portion contained in the second dense bed. More specifically when steam stripping is employed within the second dense bed 206, the second dense bed volume will be so designed such that the catalyst residence time within the bed is less than about 1 minute and preferably less than 30 seconds.

FIG. 3 shows another alternate apparatus 300 suitable for practicing this invention. Specifically, FIG. 3 represents a possible modification of existing regenerators to produce an apparatus suitable for carrying out the process of this invention. Basically an existing regeneration vessel 303 is modified to provide a first dense bed 301, a dilute phase transport riser 302, a second dense bed 306 and the associated equipment for riser 302 and bed 306. The portions of FIG. 3 generally function the same as those previously described for FIG. 1 and FIG. 2.

Briefly, spent catalyst is introduced through inlet line 309 into a first dense bed of catalyst 301 having a level or interface indicated at 310, located within transition region 328 which is positioned between first dense bed 301 and transport riser 302. A controlled stream of fresh regeneration gas necessary to achieve the desired residual coke level is introduced at line 311 into dense bed 301 through distributing device 312. Oxidation of coke contained on the spent catalyst takes place in dense bed 301 and partially spent regeneration gas and regenerated catalyst are swept out of bed 301 through transition region 328 and into transport riser 302 wherein CO oxidation takes place and where heat is transferred to the catalyst passing through the transport riser.

As described for FIG. 1, a combustible fluid may be admitted to the transport riser 302 through line 320 via distributor 321 and additionally a second stream of fresh regeneration gas may be admitted to the riser through line 318 via distributor 319.

Entrained catalyst and spent regenerated gas then pass out of transport riser 302 via riser outlet means 307 into disengaging space 305. Preferably outlet means 307 is so placed that it ejects entrained catalyst and spent regeneration gas in a downard direction to reduce the extent of catalyst entrained within the disengaging space 305.

Separation means 304, typically a cyclone separation means, has an inlet 316 and receives spent regeneration gas and any entrained catalyst from the disengaging space 305. Regeneration gas and any entrained catalyst are substantially separated from each other with the spent regeneration gas passing out of the separation means 304 and out of the regeneration zone 303 via outlet 308. Separated catalyst is passed via dipleg 317 downward toward second dense bed 306 which has an interface 315 defining the boundary between the second dense bed 306 and the disengaging space 305.

Catalyst in bed 306 moves in a downward direction and leaves the bed and the regeneration zone through conduit 322. The rate of catalyst withdraw is controlled by valve 323 which is generally operated by a reactor temperature controller.

The stripping medium can be admitted to the second dense bed 325 through line 324 via distributor 325 to effect stripping of regeneration gas from regenerated catalyst.

DESCRIPTION OF THE INVENTION

Catalysts which can be used in the process of this invention include those known to the art as fluidized catalytic cracking catalysts. Specifically the high activity zeolite-containing catalyst can be used and are preferred because of their higher resistance to the deactivating effects of high temperatures, exposure to steam, and exposure to metals contained in the feedstock. The well-known amorphous catalysts may also be used and are especially suited to the process of this invention because the lower residence times employed in this process will extend their useful life.

Charge stocks used in the catalytic cracking process are mentioned here because contaminants such as Conradson carbon and metals such as nickel, iron, and vanadium found in the charge stock usually influence the regeneration operation, catalyst selectivity, catalyst activity and the fresh catalyst makeup rate required to maintain a constant activity. A high carbon content of the feedstock as measured by a Conradson carbon analysis reduces the capacity of those units that are limited by regeneration capacity. Furthermore, regeneration temperatures tend to increase with increasing carbon content. Metals contained in the feed are also deposited on the catalyst and not only change its selectivity in the direction of less gasoline and more coke and light gas in a given reactor system but tend to deactivate the catalyst.

Because of a deleterious effect of Conradson carbon and metals, only feeds substantially free or containing but limited amounts of them are charged to most present cracking operations. For the reduction of Conradson carbons and metals such processes as vacuum distillation, deasphalting, visbreaking and coking have been used to prepare suitable feedstocks for fluid catalytic cracking. Typical feedstocks include the vacuum gas oils which boil within the range of about 400° to about 1000°F or higher depending on the limits set for Conradson carbons and metals. The term feedstocks can also include recycled materials such as gasoline, light or heavy cycle oils or slurry oil which are separated from the hydrocarbon effluent leaving the reaction zone by the main fractionation column. Because of the improved solid gas contact, shorter residence time and smaller catalyst inventories of the process of the present invention, it is an advantage of this process over those employing conventional regeneration techniques that heavier, more contaminated feedstocks can be charged to the reaction zone for a given air rate (or coke burning capacity) and a given catalyst makeup rate.

This aspect and other aspects and advantages of the present process will be made clearer by a brief reference to a typical fluid catalytic cracking process in present industry use with particular emphasis on the regeneration zone of such process.

In a typical FCC process flow, finely divided regenerated catalyst leaves the regeneration zone at a certain temperature and contacts a feedstock in a lower portion of a reaction riser zone. While the resulting mixture passes up through the riser, conversion of the feed to lighter products and to coke deposited on the catalyst occurs. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reaction riser. Typically fractions such as light gases and gasoline are further separated and processed in a gas concentration process located downstream of the main column. Some of the fractions from the main column as well as those recovered from the gas concentration process may be recovered as final product streams. The separated spent catalyst passes into the lower portion of the disengaging space and eventually leaves that zone passing through stripping means in which a stripping gas, usually steam, countercurrently contacts the spent catalyst purging adsorbed and interstitial hydrocarbons from the catalyst. The spent catalyst containing coke leaves the stripping zone and passes into a regeneration zone where, in the presence of fresh regeneration gas, combustion of coke produces regenerated catalyst and flue gas containing carbon monoxide, carbon dioxide, water, nitrogen and perhaps a small quantity of oxygen. Usually the fresh regeneration gas is air but it could be air either enriched or deficient in oxygen. The amount of fresh regeneration gas to the regeneration zone is typically controlled by a predetermined temperature differential between the flue gas outlet section and either the dense bed temperature or the dilute phase temperature. Such a control scheme minimizes excess oxygen and allows only a small amount of afterburning, that is, only that amount characterized by the temperature differential, to take place. This control scheme does not permit controllable residual coke levels; indeed its purpose is to prevent getting "behind in burning" (of coke) by controlling to allow only a small amount of CO afterburning. When such a control scheme is used the amount of residual coke left on regenerated catalyst is largely a function of regeneration zone design, that is how well gas and solids are mixed, the number of stages used, the residence time and the resulting temperature. Typically regenerated catalyst will contain less than about 0.5 wt % coke and usually from about 0.15 to 0.35 wt % coke while spent catalyst entering the regeneration zone generally contains from about 0.5 to 1.5 wt % coke. Flue gas is separated from entrained regenerated catalyst by cyclone separation means located within the regeneration zone and separated flue gas is passed from the regeneration zone typically to a carbon monoxide boiler where the chemical heat of carbon monoxide is recovered by combustion as a fuel for the production of steam. Regenerated catalyst which was separated from the flue gas is returned to the lower portion of the regeneration zone which is maintained as a dense bed of spent catalyst. Regenerated catalyst leaves this dense bed and as previously mentioned contacts the feedstock in a reaction zone. Generally, regenerated catalyst is not stripped of entrained flue gas prior to contacting the feed.

In a typical regeneration zone the spent catalyst is maintained in the bottom portion of the zone in one or more dense beds by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feed per second with 1.5 to 2.5 being the usual range.

Most of the total catalyst inventory of a fluid catalytic cracking process is contained in the regeneration zone and in view of the present industry trend toward short contact time reaction zones an even larger percentage of the total catalyst inventory is contained in the regeneration zone. The determination of the inventory in a typical regeneration zone is based upon the feed rate to the FCC process (or more specifically to the coke yield from that feed rate) and the superficial velocity. This coke yield anticipitated from a desired feed rate determines the rate of the fresh regeneration gas to the regeneration zone. This gas rate at a limiting superficial velocity then determines the cross-sectional area of the regeneration zone. With a known catalyst density and height of the dense bed the inventory of the regeneration zone, and for practical purposes for the FCC process, is fixed. Catalyst residence times which result are generally from about 2 to 5 minutes with about 2 to 3 being the general range.

With the above description as a reference point, the concepts and advantages of our invention will be made more apparent.

In the process of our invention spent catalyst is regenerated to a controllable residual coke level and CO thereby produced is essentially completely burned to $CO_2$. Spent catalyst is passed into a first dense bed with a fresh regeneration gas stream controlled such as to produce regenerated catalyst having a desired residual coke level and partially spent regeneration gas. Regeneration gas and regenerated catalyst are transported from the first dense bed to a dilute phase transport riser where CO oxidation takes place and where the heat of combustion of the CO is transferred to the catalyst. Catalyst residence time in the transport riser is sufficiently short to preclude further substantial oxidation of the residual coke and additional production of CO. Catalyst and spent regeneration gas leaving the transport riser are separated and the regenerated catalyst is passed to a second dense bed where the catalyst can be stripped of entrained regeneration gas.

It is well known in the art that the level of residual coke on the regenerated catalyst has a great influence on the conversion and product yield distribution obtained in the reaction zone, especially in the short contact time, dilute phase reaction zones. For instance, at constant reactor temperature an increase in residual coke level on regenerated catalyst will reduce conversion and gasoline yield and increase cycle oil (fuel oil)

yield. A decrease in residual coke will increase conversion at the expense of fuel oil yield and increase gasoline yield. By returning to the reaction zone regenerated catalyst having very low residual coke, it is possible to change the yield structure in the direction of increased gas yields (LPG) at the expense of gasoline yield. The process of our invention not only recognizes the effect of residual coke on yields but allows the refiner to directly control the residual coke and thereby to control product yield. Thus the refiner can switch his operation from one maximizing fuel oil production to one maximizing gasoline yields or to one where maximum LPG is desired by directly changing the residual coke level. An example of these possible operations is shown in Table I below. Operations at intermediate coke levels are of course possible as well.

can be carried from the first dense bed into the dilute phase transport riser. Velocities contemplated for the dilute phase transport riser will be in the range of about 10 to 25 feet per second.

Since velocity is not only not limited to the transport velocity but is in fact 2 to 3 times the critical velocity, dramatic catalyst inventory reductions can now be achieved. As previously described, regeneration zone catalyst inventories are directly related to superficial velocities employed within the regeneration zone. Catalyst inventories using the process of this invention will be about 40 to 60 percent of those of present single or multistage regeneration processes. A moderately sized FCC process of the type presently in industry use will contain about 150 tons of catalyst. By using the regeneration process of this invention in an FCC process of

TABLE I

PRODUCT YIELDS AT DIFFERENT RESIDUAL COKE LEVELS

| Type of FCC Operation | LPG | Gasoline | LCO (fuel oil) | Effect of residual coke at LPG conditions |
|---|---|---|---|---|
| Reactor temperature, °F | 970 | 970 | 970 | 970 |
| Feed Preheat Temp., °F | 375 | 600 | 600 | 375 |
| Regen. Cat. Delivery Temp., °F | 1350 | 1350 | 1350 | 1350 |
| Residual Coke on Regen. Catalyst, wt % | <0.02 | 0.11 | 0.62 | 0.62 |
| Yield Distribution, % on Fresh Feed | | | | |
| Conversion, LV% | 85.7 | 75.0 | 64.4 | 77.0 |
| $C_3$-$C_4$(LPG), LV% | 38.2 | 26.3 | 20.4 | 31.4 |
| Gasoline, LV% (380°F at 90% Over) | 52.0 | 62.3 | 48.3 | 58.3 |
| Light Cycle Oil, LV% | 11.4 | 20.0 | 30.6 | 18.0 |
| Clarified Slurry Oil, LV% | 5.0 | 5.0 | 5.0 | 5.0 |
| Coke, Wt % | 6.8 | 3.8 | 5.3 | 6.8 |

The first operation shown in Table No. I is an LPG operation in which maximum LPG yield is produced at the indicated operating conditions using regenerated catalyst having very low residual coke. At the very low residual coke level of <0.02 wt % the high-activity regenerated catalyst returned to the reaction zone results in higher conversion and cracks part of the gasoline present to product this higher LPG yield. At an increased residual coke level of 0.11 wt % as shown in the gasoline operation, with the same reactor temperature, less active catalyst is returned to the reaction zone and as a result the conversion and LPG yield are reduced but the yield of gasoline is increased. As the residual coke level is further increased as shown in the LCO operation to about 0.6 wt % producing even less active catalyst, the conversion and yields of LPG and gasoline are decreased but the yield of light cycle oil (fuel oil) is increased. The effect of residual coke on product yields is further illustrated in the last column of Table No. I. Here the operating conditions are the same as those of the LPG operation except for the high residual coke level which is the same as that of the LCO operation. As shown, the conversion and LPG yield are less than those for the LPG operation while the gasoline and LCO yields are higher. This is attributable to less active catalyst caused by the higher residual coke level.

Since it is not intended in the process of our invention that catalyst in the first dense bed remain in that bed the superficial velocity of the fresh regeneration gas into that bed is not limited to the critical velocity. In the first dense bed superficial velocities will be in the range of about 3 to 10 feet per second so that catalyst the same size, a refiner could save the initial investment represented by at least 75 tons of catalyst.

Catalyst makeup rates required to make up losses and maintain activity will also be reduced because such rates tend to be a percentage of the total catalyst inventory. Conversely, as previously mentioned, a heavier, more contaminated feed could be charged to an FCC process employing this invention without requiring a makeup rate in excess of that presently accepted on an FCC process using conventional regeneration techniques. Feedstocks would no longer have to be limited to relatively clean vacuum gas oils containing limited quantities of Conradson carbons, metals and nitrogen compounds. Higher molecular weight feed-stocks containing higher amounts of these contaminants could better be tolerated with no additional economic penalty. Because such feed streams require less processing, the refiner will realize an additional savings.

Better solid-gas contact and reduced residence times of both catalyst and regeneration gas are other advantages of the higher velocity. Higher velocities will produce more turbulent flow with better mixing and hence will result in more efficient regeneration. Because of this better gas-solid contact, along with the higher oxygen partial pressure and higher temperature, the rate of coke combustion will be increased and catalyst residence times can therefore be reduced. Catalyst residence times can be reduced from the present 2 to 5 minutes to less than 2 minutes and regeneration gas residence times can be reduced from about 20 seconds to less than 10 seconds. Better oxygen utilization will reduce the amount of fresh regeneration gas required which would therefore allow the regeneration zone pressure to be reduced. With shorter catalyst exposure time to high temperatures, catalyst activity will be prolonged and reduced fresh catalyst makeup rates can result.

From the standpoint of savings to be effected another important result of shorter catalyst residence time is that it now allows the steam stripping of flue gas components from the regenerated catalyst. It is present industry practice to strip only spent catalyst; spent catalyst from a reaction zone is stripped of absorbed and interstitial hydrocarbons before the catalyst is sent to the regeneration zone for the purpose of recovering valuable gasoline and light hydrocarbons that would otherwise be burned in the regeneration zone. Although it is known that prolonged exposure to steam will deactivate catalyst, steam is generally the preferred stripping medium rather than an inert gas because it can be condensed and separated before reaching the gas concentration section of the FCC process. The amounts used, however, are small and the short catalyst residence time, the low temperature and the coke on the catalyst minimize any deactivation. In spite of the fact that flue gas components are entrained by regenerated catalyst into the reaction zone and hence become part of a product stream, steam stripping of regenerated catalyst has generally not been practiced because of the longer catalyst residence time in the regeneration zone and the large catalyst inventory which is generally contained in a single dense bed. Exposure of this quantity of catalyst to steam for this longer period of time would increase the catalyst deactivation rate. Although an inert gas such as nitrogen would not tend to deactivate the catalyst, it would merely replace flue gas components, which are in themselves inert, and be carried into the product recovery and separation section of the FCC process. The following example and more detailed description will make clear this advantage of the process of this invention.

The effluent from the reaction zone of an FCC process actually contains not only hydrocarbons but steam from spent catalyst stripping and flue gas components in amounts from about 1 to 3 pounds per thousand pounds of catalyst circulated in the FCC process. In a typical FCC process of modest size, about 3,000,000 lb./hr. of catalyst will be circulated and will therefore entrain about 4500 lb./hr. of flue gas components into the reaction zone. This means that on a volume basis the reactor effluent will contain about 60,000 SCFH or 1,440,000 SCFD of flue gas components to be processed downstream of the reaction zone. The total reaction zone effluent is directed to the main column where it is separated into gas and unstabilized gasoline as an overhead product stream and various side cut product streams. This overhead product stream containing the flue gas components, light hydrocarbon gases, steam and gasoline is directed first to a main column overhead condenser where steam and gasoline are condensed and then to a main column overhead receiver where the gasoline and water are separated and the water is drawn off. In order to recover and separate light hydrocarbons and to stabilize the gasoline, the gas and unstabilized gasoline from the receiver are sent to a gas concentration process consisting primarily of a compressor, absorber columns, and fractionation columns along with associated equipment. To recover the light hydrocarbons the gas stream from the receiver, containing flue gas components, is first compressed to about 150 to 250 psig before being directed to the absorber columns. Light hydrocarbons, primarily $C_3$'s and $C_4$'s, are absorbed by heavier liquid hydrocarbon streams in the absorber columns leaving an unabsorbed lean gas containing the flue gas components as a product stream from the last absorber. A typical analysis of the off gas leaving the last absorber is as follows:

TABLE NO. II

| Absorber Off Gas | |
|---|---|
| Composition (mol %) | |
| Carbon Dioxide | 3.8 |
| Oxygen + Argon | 0.3 |
| Nitrogen | 22.8 |
| Carbon Monoxide | 4.5 |
| Hydrogen | 8.9 |
| Methane | 23.6 |
| Ethylene | 11.8 |
| Ethane | 12.5 |
| Propylene | 4.8 |
| Propane | 1.4 |
| Isobutylene + 1-Butene | 0.7 |
| Cis-2-Butene | 0.4 |
| Trans-2-Butene | 0.5 |
| Isobutane | 1.7 |
| Normal Butane | 0.5 |
| Isopentane | 0.7 |
| Normal pentane | 0.2 |
| Total $C_6$+ and $C_5$ Olefins | 0.9 |
| | 100.0 |

As can be seen from the breakdown, the entrained flue gas components, nitrogen, carbon monoxide, and carbon dioxide, constitute about one-third of this product stream, (31.1%). Because of the short catalyst residence time employed in the process of our invention, stripping of the regenerated catalyst can be employed whereby most of this material would have been carried out of the regeneration zone rather than becoming a substantial part of this product stream. Without these components, substantial savings can be realized by using a less expensive gas plant, that is, one having smaller compressors and smaller absorbers along with other gas handling equipment. As well, the absorber off-gas which is generally used as a fuel would have a higher heat content.

When such stripping of regenerated catalyst in the second dense bed is provided, the bed volume will be so sized as to allow minimum catalyst exposure to steam. The bed volume will be sized to provide a catalyst residence time of less than about 1 minute and preferably less than about 30 seconds.

Temperatures employed in the first dense bed where coke oxidation takes place will be in the range of about 1250° to 1400° F and temperatures in the transport riser where combustion of CO and perhaps an additional combustible fluid takes place, will be in the range of about 1275° to about 1475° F. The exposure time of regenerated catalyst to these higher temperatures in the transport riser can be varied by the position of the fresh regeneration gas inlet into the transport riser. For shorter exposure times the inlet to the transport riser would be positioned nearer the riser outlet.

It is preferred that the temperature in the transport riser and the exposure time of the regenerated catalyst within the riser be such as to heat the catalyst which is passing through the riser to a temperature of at least 1250° F, preferably in the range of about 1250° F to 1400° F. Catalyst delivered to the reaction zone within this temperature range will not only promote rapid and efficient primary cracking of the feedstock but will reduce the feed preheat requirement. Normally feed to the reaction zone is preheated to about 500°–700° F before contact with the regenerated catalyst to provide an additional heat input. Should the heat of combustion of CO within the transport riser be insufficient to heat the catalyst to the desired temperature, an additional combustible fluid may be added to and burned within the riser for this purpose. The combustible fluid could be fuel gas or any liquid hydrocarbon stream including the feedstock. This combustible fluid could as well be added to and burned in the first dense bed. The rate of fresh regeneration gas, controlled to oxidize coke to a predetermined residual coke level, would be increased slightly to take the combustible fluid into account.

A practical and economical advantage of essentially complete oxidation of CO within the regeneration zone is that it eliminates an air pollution problem without the necessity of a rather expensive CO boiler. Because of an increased worldwide awareness of the effects of a polluted environment on human health, particularly where an awareness is evidenced by more restrictive air pollution regulations, this advantage of our invention is very important. Since the heat of combustion of CO is transferred to the catalyst, an additional advantage is that the feed preheat requirement is reduced.

Pressures contemplated for use in the process of this invention are from about normal atmospheric pressure up to about 50 psig with the preferred range being 10 to 40 psig. Because of the improved gas-solid contact due to higher velocities, higher $O_2$ partial pressure due to more air for higher velocity, and the higher coke burning rate because of higher temperatures, lower pressures can be employed in the process of this invention with less penalty in coke burning capacity than for conventional designs. For this reason the process may reverse the present industry trend toward higher pressure regeneration processes. Less expensive vessels and air blower or compressors having lower pressure ratings therefore can be used.

Spent catalyst as used in this specification means catalyst withdrawn from a reaction zone because of reduced activity caused by coke deposits. Spent catalyst passing into the first dense bed can contain anywhere from a few tenths up to about 5 wt % of coke but typically in FCC operations spent catalyst removed from the reaction zone will contain from about 0.5 to about 1.5 wt % coke. The regenerated catalyst as used in this specification is catalyst from which essentially no more coke will be removed. For purposes of this specification catalyst leaving the first dense bed will be considered regenerated catalyst. The residence time of this catalyst within the dilute phase transport riser will be sufficiently short to preclude further coke oxidation. The regenerated catalyst will typically contain from about 0.5 wt % coke to as little as about 0.02 wt % coke depending upon the conversion level and yield structure desired from the reaction zone.

The term regeneration gas as used in the claims and in this specification shall mean, in a generic sense, any gas which is to contact catalyst or which has contacted catalyst within the regeneration zone. Specifically the term fresh regeneration gas shall include oxygen-containing gases such as air or oxygen enriched or deficient air which pass into the first dense bed of the regeneration zone to allow oxidation of coke on the spent catalyst therein. Partially spent regeneration gas shall refer to regeneration gas which has contacted catalyst within the first dense bed and which contains a reduced quantity of free oxygen. Typically the partially spent regeneration gas contains water, nitrogen, oxygen, carbon monoxide and carbon dioxide. Spent regeneration gas shall mean regeneration gas which contains substantially no carbon monoxide, from about a few tenths up to as much as 15 mole % free oxygen, carbon dioxide, nitrogen and water.

One or more gas-solids separation means may be utilized to separate spent regeneration gas from entrained regenerated catalyst. It is preferred, but not necessary to the process of this invention, that the catalyst separation means be connected to the dilute phase transport riser to receive and separate regeneration gas from entrained catalyst. Preferred separation means will be cyclone separators whose design and construction is well known to the art. A single cyclone may be used but preferably more than one of these cyclones will be used in parallel or in series flow arrangements to effect the desired degree of separation.

EXAMPLE

The following example is presented illustrating and comparing the process of our invention for the regeneration of spent catalyst with a conventional single stage regeneration method. In both cases a commercially available molecular sieve catalyst, which had previously been contacted with a vacuum gas oil under cracking conditions in a reaction zone and which had been subsequently steam stripped in a stripping zone, was regenerated with air. The coke contained 10.1 wt % hydrogen and coke on spent catalyst was about 0.9 wt %. The conventional regeneration zone contained a single dense bed in the bottom portion of the zone with a large dilute phase disengaging space positioned above the dense bed and the flue gas from this regeneration zone was burned in an external CO boiler. Analysis of the flue gas shown in Table No. III was for a sample removed from the flue gas line before the CO boiler. In the process of our invention CO (without an additional combustible fluid) was essentially completely combusted within the dilute phase transport riser of the regeneration zone. The flue gas sample for which the analysis is shown in Table No. III was taken just before flue gas exiting the regeneration zone was vented to the atmosphere.

TABLE NO. III

REGENERATION PROCESS COMPARISON

|  | Conventional | Present Invention |
|---|---|---|
| Temperatures, °F |  |  |
| dense bed | 1190 | 1250 |
| dilute phase | 1185 | — |
| transport riser | — | 1365 |
| flue gas | 1245 | 1360 |
| second dense bed | — | 1340 |
| Pressure, psig | 24.6 | 20 |
| Net dry air to regenerator lb/hr | 232,170 | 231,290 |
| Dry air/coke, lb/lb | 11.13 | 14.51 |
| Coke yield, wt % of fresh feed (at 75% reaction zone conversion) | 6.61 | 5.05 |
| Coke on regenerated catalyst wt % | 0.2 | 0.02 |
| Controllable Coke | no | yes |
| Vessel size, diameter, ft. | 25 | 16 |
| Catalyst residence time, min | 3 | 0.9 |
| Gas residence time, sec. | 15.5 | 5.5 |
| Superficial velocity, ft/sec |  |  |
| dense bed | 2.4 | 5 |
| dilute phase | 2.4 | 20 |
| Flue Gas Analysis, vol % |  |  |
| $CO_2$ | 9.2 | 14.9 |
| Argon | 1.1 | 1.0 |
| $N_2$ | 79.2 | 82.3 |
| CO | 10.2 | 0 * |

TABLE NO. III-continued

REGENERATION PROCESS COMPARISON

|  | Conventional | Present Invention |
|---|---|---|
| $O_2$ | 0.2 | 1.8 |
| $CH_4$ | 0.1 | 0 |
| Regenerated catalyst stripping | no | yes |
| Feed preheat, °F | 412 | 277 |
| Catalyst Inventory, Tons | 60 | 35 |

\* Actual reading was 270 ppm vol.

The comparison of the process of our invention with the conventional single stage regeneration process first of all shows the higher temperatures and higher oxygen concentration of our invention. Although the inlet oxygen concentration in both cases is the same, (that of air) the outlet concentration from the process of our invention is 1.8 vol. %, compared to 0.2 vol. % from the conventional regeneration process. The higher regenerated catalyst temperature of our invention has reduced the catalyst circulation rate and thereby reduced the coke yield from 6.61 wt % to 5.05 wt. %. This higher temperature has also reduced the feed preheat requirement by 135° F and, although not shown, will promote more rapid and efficient primary cracking of the feedstock in the reaction zone than will the lower temperature. This lower coke yield and more efficient cracking will result in more liquid product yield from the reaction zone. Because of the faster coke burning rate, caused by the higher temperature and higher oxygen concentration, our process has produced in this instance regenerated catalyst having a lower residual coke level. The product yield structure from the reaction zone, although not shown, will therefore be in the direction of lighter, more valuable products.

It must be noted also that in addition to making less coke yield at a particular conversion level, our process, in contrast to the conventional process, has the capability of controlling residual coke directly. It therefore offers the refiner a quick and convenient means of controlling the reaction zone conversion level and the production yield structure.

Table No. III flue gas analyses show that by combusting CO within the regeneration zone our process has essentially eliminated an air pollution problem without requiring a CO boiler. It is to be noted also that this essentially complete CO combustion, and the coke oxidation to a lower residual coke level, was achieved using less air (lb/hr) at a lower pressure than that for the conventional process.

Additionally the catalyst inventory is about 40% less than that of the conventional process and therefore the size of the regeneration vessel is small. Although not shown, it is anticipated that because of the smaller inventory and shorter catalyst residence time, catalyst makeup rates will be less for our new process.

As indicated in Table III the regenerated catalyst is stripped in the present process but not in the conventional process. Although not shown in the table, the advantage of this stripping would be very apparent in a comparison of equipment sizes required in the gas concentration section.

The above specific example has been presented to illustrate preferred embodiments and advantages of the process of our invention. We do not intend to unreasonably limit the claims of our process by specific reference to sizes, flow rates, pressures, or analyses.

We claim as our invention:

1. A process for the regeneration of a zeolite-containing or an amorphous coke-contaminated spent hydrocarbon cracking catalyst, removed from a reaction zone, and the conversion of carbon monoxide, resulting from the oxidation of coke from said catalyst, to carbon dioxide, wherein the residual coke on the regenerated catalyst is directly controllable which process is operated within a pressure range from about normal atmospheric to about 50 psig. and comprises the steps of:
   a. passing said catalyst and a fresh free oxygen-containing regeneration gas in a controlled amount to a first dense bed of fluidized particulate catalyst in a regeneration zone and oxidizing coke in said first dense bed maintained at oxidizing conditions including a temperature within the range of about 1250° F. to about 1400° F., a superficial gas velocity within the range of about 3 to about 10 feet per second, and a catalyst residence time of less than two minutes;
   b. controlling the amount of fresh free oxygen-containing regeneration gas of step (a) passed into said dense bed to oxidize said coke to a predetermined residual coke level, to produce regenerated catalyst having a desired residual coke level and partially spent regeneration gas containing CO;
   c. passing said regenerated catalyst and partially spent regeneration gas to a dilute phase transport riser communicating with and superimposed over said frist dense bed and therein essentially completely converting CO to $CO_2$ at conversion conditions including a temperature within the range of about 1275° F. to 1475° F., a superficial gas velocity within the range of about 10 to 25 feet per second, and a residence time which precludes further substantial oxidation of residual coke and additional production of CO, to produce spent regeneration gas;
   d. separating the thus-regenerated catalyst from said spent regeneration gas; and,
   e. introducing said regenerated catalyst to a second dense bed of particulate material, from which said regenerated catalyst is returned to said reaction zone.

2. The process of claim 1 further characterized in that said regenerated catalyst is stripped of spent regeneration gas in said second dense bed.

3. The process of claim 1 further characterized in that the total residence time of regeneration gas in said first dense bed and dilute phase transport zone is less than 10 seconds.

4. The process of claim 1 further characterized in that said predetermined residual coke level is from about 0.02 wt. % to about 0.5 wt. % coke.

5. The process of claim 2 further characterized in that the catalyst residence time of said regenerated catalyst in said second dense bed is less than about 1 minute.

\* \* \* \* \*